(12) United States Patent
Murakami et al.

(10) Patent No.: US 10,825,572 B2
(45) Date of Patent: Nov. 3, 2020

(54) CHARGE STRIPPING FILM FOR ION BEAM

(71) Applicant: KANEKA CORPORATION, Osaka (JP)

(72) Inventors: Mutsuaki Murakami, Osaka (JP); Masamitsu Tachibana, Osaka (JP); Atsushi Tatami, Osaka (JP)

(73) Assignee: KANEKA CORPORATION, Osaka (JP)

( * ) Notice: Subject to any disclaimer, the term of this patent is extended or adjusted under 35 U.S.C. 154(b) by 60 days.

(21) Appl. No.: 16/257,523

(22) Filed: Jan. 25, 2019

(65) Prior Publication Data
US 2019/0159330 A1 May 23, 2019

Related U.S. Application Data

(63) Continuation of application No. 15/783,242, filed on Oct. 13, 2017, now abandoned, which is a (Continued)

(30) Foreign Application Priority Data

Apr. 15, 2015 (JP) ................. 2015-083716

(51) Int. Cl.
*G21K 1/14* (2006.01)
*H05H 7/08* (2006.01)
(Continued)

(52) U.S. Cl.
CPC ................. *G21K 1/14* (2013.01); *B32B 9/007* (2013.01); *B32B 27/281* (2013.01); *C08J 5/18* (2013.01);
(Continued)

(58) Field of Classification Search
CPC ........ G21K 1/14; B32B 9/007; B32B 27/281; B32B 2307/302; B32B 2307/54;
(Continued)

(56) References Cited

U.S. PATENT DOCUMENTS 6,462,348 B1  10/2002  Gelbart
2016/0249453 A1*  8/2016  Tatami ................. C01B 32/20
(Continued)

FOREIGN PATENT DOCUMENTS

CN   104445174 A   3/2015
JP   H1064699 A    3/1998
(Continued)

OTHER PUBLICATIONS

Office Action issued in U.S. Appl. No. 15/783,231, dated Sep. 25, 2018 (10 pages).
(Continued)

*Primary Examiner* — Daniel C. McCracken
(74) *Attorney, Agent, or Firm* — Osha Liang LLP

(57) ABSTRACT

A charge stripping method includes irradiating a charge stripping film with an ion beam. The charge stripping film includes a single layer body of a graphitic film having a carbon component of at least 96 at % and a thermal conductivity in a film surface direction at 25° C. of at least 800 W/mK, or a laminated body of the graphitic film. The charge stripping film has a thickness of not less than 100 nm and less than 10 μm, a tensile strength in a film surface direction of at least 5 MPa, a coefficient of thermal expansion in the film surface direction of not more than $1 \times 10^{-5}$/K, and an area of at least 4 cm$^2$.

14 Claims, 1 Drawing Sheet

Related U.S. Application Data continuation of application No. PCT/JP2016/061983, filed on Apr. 14, 2016.

(51) Int. Cl.

| | |
|---|---|
| *H05H 13/04* | (2006.01) |
| *B32B 9/00* | (2006.01) |
| *B32B 27/28* | (2006.01) |
| *C08J 5/18* | (2006.01) |
| *H05H 7/10* | (2006.01) |
| *C01B 32/20* | (2017.01) |
| *H05H 7/00* | (2006.01) |
| *C01B 32/205* | (2017.01) |

(52) U.S. Cl.
CPC ............... *H05H 7/08* (2013.01); *H05H 7/10* (2013.01); *H05H 13/04* (2013.01); *B32B 2307/302* (2013.01); *B32B 2307/54* (2013.01); *C01B 32/20* (2017.08); *C01B 32/205* (2017.08); *H05H 2007/005* (2013.01); *H05H 2007/088* (2013.01)

(58) Field of Classification Search
CPC .... C08J 5/18; H05H 7/10; H05H 7/08; H05H 13/04; H05H 2007/088; H05H 2007/005; C01B 32/205; C01B 32/20
See application file for complete search history.

(56) References Cited

U.S. PATENT DOCUMENTS

| | | |
|---|---|---|
| 2017/0267908 A1 | 9/2017 | Murakami et al. |
| 2018/0049306 A1 | 2/2018 | Murakami et al. |

FOREIGN PATENT DOCUMENTS

| | | | |
|---|---|---|---|
| JP | 2010-168281 A | 8/2010 | |
| JP | 2010195609 A | 9/2010 | |
| WO | WO 2015/0456641 | * 2/2015 | ............. C01B 31/04 |

OTHER PUBLICATIONS

International Search Report issued in International Application No. PCT/JP2016/061969; dated Jul. 5, 2016 (2 pages).
Extended European Search Report issued in corresponding Application No. 16780098.6; dated Nov. 15, 2018 (8 pages).
Extended European Search Report issued in corresponding Application No. 16780102.6; dated Dec. 7, 2018 (7 pages).

* cited by examiner

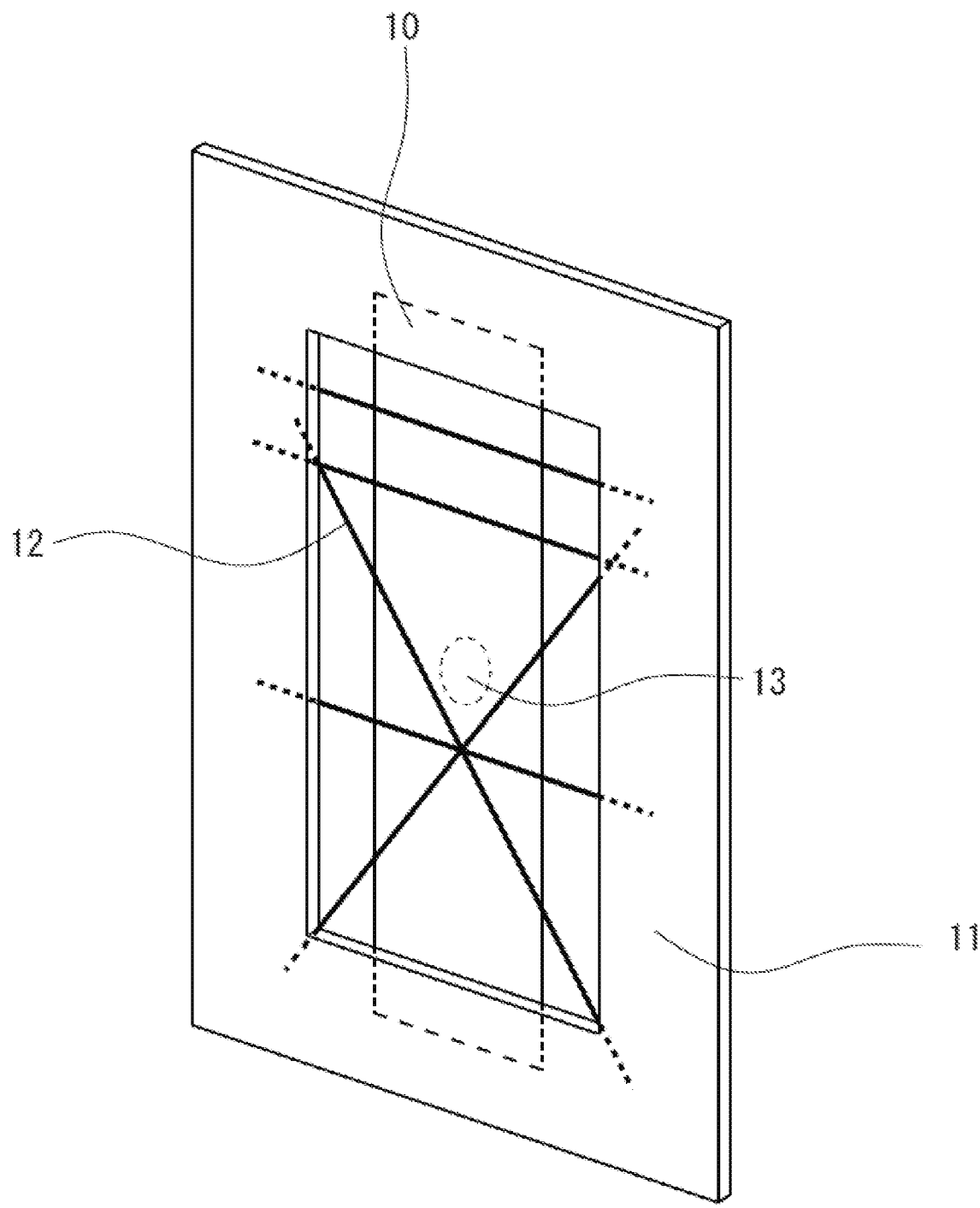

CHARGE STRIPPING FILM FOR ION BEAM

TECHNICAL FIELD

One or more embodiments of the present invention relate to a charge stripping film that is used for converting charge of an ion beam, and more specifically to a charge stripping film for an ion beam for generating an ion beam with higher charge state by irradiating the film with an ion beam to remove electrons from ions. One or more embodiments of the present invention relate to a charge stripping film for an ion beam with very high durability under high intensity beam irradiation.

BACKGROUND

A high intensity ion beam made by an accelerator plays an important role for elucidating phenomena in life-science and particle physics, and researches and developments for use of high intensity beams are actively performed all over the world (Non-Patent Document 1).

One of the most frequently used high intensity beams is a positron beam. A positron beam is composed of a large number of "proton" that is an atomic nucleus of hydrogen and accelerating up to approximately the speed of light. As for the positron beam, an H⁻ beam that is accelerated by a linear accelerator undergoes charge stripping to become an H⁺ beam by a charge stripping film installed in an injection part of a small synchrotron, and followed by acceleration in a small synchrotron then a large synchrotron to become a positron beam with high intensity. This proton beam is used for various experiments such as neutrino experiments, structure analysis experiments, and medical treatments (positron therapy).

Since the charge stripping film for an ion beam of atom is exposed both an injection and an orbital beams, the film is deformed or broken by beam irradiation or heat generation by the beam irradiation (not less than 1500 K). The durability (life time) of the charge stripping film is an important determining factor for the continuous operation of the beam line. Since the charge stripping film is radioactivated by irradiation with a high intensity beam, the operator could be exposed to the radiation during the replacement of the charge stripping film. Therefore, development of a charge stripping film with high charge stripping efficiency, excellent durability, no radiation under high intensity beam irradiation is required (Non-Patent Document 2).

A charge stripping film for an ion beam, a carbonaceous film is widely used. When a carbonaceous film is used as a charge stripping film for an ion beam, a desired range of thickness of the carbon film is predetermined by the charge state of the original beam and after charge stripping, and the kind of the beam so as to obtain a desired charge conversion efficiency. The film thickness, which is out of the desired range, influences on both the charge distribution and the charge stripping efficiency of the ion beam (Non-Patent Document 1). The specific weight per unit area of carbon is required for converting the high intensity beam to have a desired charge state. For example, a required carbon weight for charge stripping of carbon ion (carbon beam) is not less than $0.02$ mg/cm² and not more than $2.0$ mg/cm² per unit area. A biased charge state distribution of ion beam occurs using a carbon film, which is out of the range. Thus, the film thickness within the range of not less than $0.02$ mg/cm² and not more than $2.0$ mg/cm² of the carbon film and controlling the film thickness freely are both important for the high conversion efficiency of the carbonaceous charge stripping film.

The density of the carbon film used as a charge stripping film for an ion beam with an atomic number smaller than oxygen (atomic number 8) may be not less than $1.6$ g/cm³ and not more than $2.26$ g/cm³. For example, when the density is $2.0$ g/cm³, the thickness of the film may be not less than 100 nm and less than 10 μm so as to satisfy a specific range of weight per unit area. For example, in the case of a proton beam, it is considered that the carbon film having a thickness of about 1.5 μm is ideal for making the conversion rate from H⁻ to H⁺ 99.7%. Thus, there has been demanded a carbon film for a charge stripping film capable of responding to the demand of various beam lines, and adapting to various thicknesses and having sufficient durability.

As such charge stripping films, a carbon film prepared by vapor-deposition method such as arc discharge (Patent Document 1) and a charge stripping film comprising a hybrid of carbon and boron (Patent Document 2) have been reported. However, the carbon films break in a very short time by high intensity proton beam irradiation.

Meanwhile, the carbon-boron hybrid type charge stripping film has significantly longer life time compared to a conventional carbon film, however, the life time of the films are still insufficient. For this reason, a replacing a lot of charge stripping films enables continuous ion beam operation for a year without breaking the vacuum. Further the physical strength of the carbon-boron hybrid film is weak, and sodium impurities which is contained in the reagent during film fabrication process are radioactivated after an ion beam irradiation. (Non-Patent Document 2).

An attempt to improve the properties of the charge stripping film has been made, and one of such an attempt is a carbon nanotube (CNT) composite film (Patent Document 3). Although this composite film has high mechanical strength, it can be damaged after a long-time operation due to its poor heat resistance. Thus, it is necessary to suspend the operation of the accelerator every time such damage occurs (Non-Patent Document 3). A CNT composite film which containing iron and silicon impurities is easily radioactivated after beam irradiation and several months are required for the charge stripping film to be transferable from the radiation controlled area. From these points of view, it has been urgent to develop a charge stripping film for an ion beam formed of high purity carbon, having high quality and high heat resistance for a charge stripping film and no radioactivation.

As a method for improving the heat resistance of the carbon film, use of a graphite film is promising. As a candidate for such a film, a graphite film utilizing natural graphite has been proposed (Patent Document 4). This graphite film is produced by washed expanded graphite (obtained by thermal expanding of natural graphite using an intercalation compound such as acid), followed by pressing (hereinafter, described as expanded graphite film). Therefore, the mechanical strength of the film is weak, and it is difficult to produce or control a thin film of not more than 20 μm.

As previously described, for the purpose of charge stripping of an ion beam, an optimum thickness for the individual ion beam is known. For example, a thin film of less than 10 μm is required for a smaller atomic number than oxygen, it is difficult to use or make an expanded graphite film with the thickness of not more than 20 μm. Further, the strength of the film is weak, the film breaks easily in the vacuumed casing and leading the fear of scattering of the broken pieces of graphite which is not desired. Therefore, an expanded graphite film is not able to be used for satisfying the above purpose.

PATENT DOCUMENTS

[Patent Document 1] JPB1342226
[Patent Document 2] JPB5309320
[Patent Document 3] JPB4821011
[Patent Document 4] JPB4299261

Non Patent Documents

[Non Paten Document 1] 27th International Conference of the International Nuclear Target Development Society (INTDS-2014) Tokyo, Japan, August, 2014.
[Non Patent Document 2] Y. Yamazaki et al., Journal of Radioanalytical and Nuclear Chemistry vol. 305, 2015, pp. 859-864, Proceedings of the 27th World Conference of the International Nuclear Target Development Society State-of-the-art technologies for Nuclear Target and Charge Stripper.
[Non Patent Document 3] Hasebe H. et al Journal of Radioanalytical and Nuclear Chemistry, 2014, 299, 1013-1018.

SUMMARY

One or more embodiments of the present invention provide a charge stripping film for an ion beam that is unlikely to be damaged or radioactivated even under high intensity beam irradiation with high durability, heat resistance, and that makes it easy to control film thickness to be less than 10 µm, and a charge stripping film for an ion beam may exhibit excellent mechanical strength.

One or more embodiments of the present invention provide a charge stripping film (1) for ion beam, comprising a single layer body of a graphitic film having a carbon component of not less than 96 at % and a thermal conductivity in a film surface direction at 25° C. of not less than 800 W/mK, or a laminated body of the graphitic film, wherein the charge stripping film has a thickness of not less than 100 nm and less than 10 µm.

One or more embodiments of the present invention also include a charge stripping film (2) for ion beam of negative hydrogen, hydrogen or carbon, comprising a single layer body of a graphitic film having a carbon component of not less than 98 at % and a thermal conductivity in a film surface direction at 25° C. of not less than 1000 W/mK, or a laminated body of the graphitic film, wherein the charge stripping film has a thickness of not less than 100 nm and not more than 5 µm.

In (1) or (2), (3) the charge stripping film for an ion beam may have a tensile strength in a film surface direction of not less than 5 MPa, and a coefficient of thermal expansion in the film surface direction of not more than $1 \times 10^{-5}$/K, and (4) an area of the charge stripping film for an ion beam may be not less than 4 cm$^2$.

(5) The charge stripping film for an ion beam according to any one of (1) to (4) may be obtained by heat-treating a polymer film at a temperature of not less than 2400° C. in an inert gas atmosphere. (6) The polymer film may be at least one selected from polyamide, polyimide, polyquinoxaline, polyparaphenylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof. (7) In one or more embodiments of the present invention, the polymer film may be an aromatic polyimide.

(8) The aromatic polyimide in (7) may be obtained by using either or both of pyromellitic anhydride, and 3,3',4,4'-biphenyltetracarboxylic dianhydride as a raw material. (9) The aromatic polyimide in (7) or (8) may be obtained by using either or both of 4,4'-diaminodiphenylether, and p-phenylene diamine as a raw material.

One or more embodiments the present invention also include a charge stripping film (10) for ion beam, wherein one or more carbonaceous layers formed by vapor deposition or sputtering are laminated on the charge stripping film for an ion beam according to any one of (1) to (9).

Further, one or more embodiments of the present invention include a process for producing the charge stripping film for an ion beam according to any one of (1) to (9), the production process is concretely a process for producing the charge stripping film for an ion beam, wherein a polymer film is heat-treated at a temperature of not less than 2400° C. in an inert gas atmosphere.

In one or more embodiments of the present invention, the charge stripping film for an ion beam of has excellent heat resistance because it is a graphitic film, and the film is unlikely to be damaged under long-time high intensity beam irradiation and the film has excellent durability because the thermal conductivity in the film surface direction is not less than 800 W/mK. Since it has high carbon purity, there is little fear of radioactivation by an ion beam irradiation, and there is no fear of outgassing even in high vacuum. Further, the charge stripping film as described herein enables to create the uniform thickness less than 10 µm, and the film has sufficient physical strength, thus the charge stripping film is capable of processing or handling easily.

BRIEF DESCRIPTION OF THE DRAWINGS

The FIGURE is a schematic perspective view of a fixing jig for evaluation of durability of a charge stripping film for an ion beam according to one or more embodiments of the present invention.

DETAILED DESCRIPTION OF THE EMBODIMENTS

According to one or more embodiments of the invention, the charge stripping film for an ion beam is a graphitized film (graphitic film) among other carbon films, and has a thermal conductivity in the film surface direction of not less than 800 W/mK. Therefore, the charge stripping film achieves high charge stripping efficiency even with a thickness of not less than 100 nm and less than 10 µm, and is not deformed or damaged under irradiation with a high intensity beam, and has excellent durability. Further, since the carbon component is not less than 96 at %, radioactivation is controlled. That is, the charge stripping film for an ion beam as described herein could achieve significant improvement of durability, reduction in damage, and reduction in radioactivation as compared with a conventional carbonaceous charge stripping film or a carbon-boron hybrid film. Further, in one or more embodiments of the present invention satisfying the requirements as described above, it is possible to make the tensile strength in the film surface direction not less than 5 MPa, and the coefficient of thermal expansion in the film surface direction not more than $1 \times 10^5$/K, and also from these points, it can be said that the damage is suppressed, and durability is improved.

The merit of employing a graphitic film as a charge stripping film for an ion beam lies in improvement in the heat resistance. This is attributed that the graphite has thermally the most stable structure among carbon crystal systems. By employing a graphitic film, it is possible to increase the thermal conductivity. As the thermal conductivity increases, it is possible to increase the heat releasing effect, and prevent the temperature of the film from rising due to the heat accumulated in the film. The thermal conductivity in the film surface direction at a temperature of 25° C. of the charge stripping film for an ion beam according to one or more embodiments of the present invention is not less than 800 W/mK. The higher the heat diffusivity is, the higher the capability to diffuse the heat that is locally generated, and the film can withstand the long-time irradiation with a high intensity beam. Therefore, the thermal conductivity may be not less than 1000 W/mK, or not less than 1400 W/mK, or not less than 1600 W/mK. The thermal conductivity may be, for example, not more than 2500 W/mK, and may be not more than 2300 W/mK. The reason of very low durability of the conventional carbon films as recited in the foregoing Patent Documents 1 and 2 is considered that the carbon film is in a state approximate to the amorphous state, and is short of heat resistance, and has low thermal conductivity for releasing the heat.

The thickness of the charge stripping film for an ion beam according to one or more embodiments of the present invention is not less than 100 nm and less than 10 µm. While the kind of the atom of the ion beam for which charge stripping is conducted by the charge stripping film as described herein is not particularly limited, the aforementioned thickness of the film may be used, in particular, for charge stripping of ion beams of atoms having an atomic number of not more than 8 (light atom having an atomic number of not more than that of oxygen). Among these, for the purpose of generating a carbon beam by charge stripping of carbon ions, a thickness within such a range may be used. The thickness of the charge stripping film may be not more than 5 µm. In one or more embodiments of the present invention, the range of thickness of the film for charge stripping is not less than 100 nm and less than 10 µm, and the thickness of the charge stripping film for an ion beam may be adjusted depending on the kind and intensity of the beam for use, and the conversion efficiency to an intended charge state.

The carbon purity of the charge stripping film for an ion beam according to one or more embodiments of the present invention is not less than 96 at %. The higher the carbon purity, the more the radioactivation under the long-time irradiation with a high intensity beam can be prevented. Therefore, the carbon purity may be not less than 97 at %, or not less than 98 at %, or not less than 99 at %. Particularly, metallic impurities such as aluminum, iron, sodium, potassium, cobalt, titanium and nickel that can be a cause of radioactivation are desirably not more than detection limits. In one or more embodiments of the present invention, the raw material of the charge stripping film for an ion beam is a polymer film as will be described later, and there is no chance that the charge stripping film is contaminated by impurities including metal during the production process thereof. Also, by annealing at a temperature of not less than 2400° C. as will be described later, nitrogen, oxygen and hydrogen in the polymer are eliminated and only pure carbon remains. Therefore, the method according to one or more embodiments of the present invention is a very excellent method for forming a film composed exclusively of pure carbon, and has a feature of being unlikely to have contaminants other than carbon.

Among use applications of the charge stripping film for an ion beam, as a charge stripping film especially for ion beam of a negative hydrogen, hydrogen or carbon, the charge stripping film for an ion beam may have a thickness of not less than 100 nm and not more than 5 µm, a carbon component of not less than 98 at %, and a thermal conductivity in the film surface direction of not less than 1000 W/mK. Since ion beams of negative hydrogen, hydrogen and carbon are beams having very high energy, the characteristics required for the charge stripping film are stricter. The reason why a thinner graphitic film may be used in the use application for an ion beam of negative hydrogen, hydrogen or carbon, in which higher properties are required, is considered as follows. As will be described later, the charge stripping film according to one or more embodiments of the present invention is produced by a polymer annealing method, and in the polymer annealing method, graphitization reaction is considered to proceed in the following manner. First, a graphitization reaction starts from the outermost layer of the polymer carbonized film, and the graphite structure grows toward inside the film. As the film thickness of the carbon film increases, the graphite structure becomes more disordered and a cavity or a defect is more likely to arise toward inside the carbon film at the time of graphitization. Contrarily, as the film thickness decreases, the graphitization proceeds to inside in the condition that the graphite layer structure of the film surface is well-ordered, resulting that a graphite structure that is well-ordered all over the film is likely to be formed. Thus, it is supposed that a film having higher thermal conductivity is obtained as the film thickness is smaller because the graphite layer structure is well-ordered, and the film can be used also for a beam of high energy. For example, it has been confirmed that when aromatic polyimide (film thickness 8 µm) is used as a raw material, the thickness of the graphitic film obtained by a treatment at 2400° C. for 30 minutes is 4 µm, and the carbon component is not less than 98 at %, and the thermal conductivity in the film surface direction is not less than 1000 W/mK. In short, it is understood that a graphitic film having a higher carbon purity and higher thermal conductivity can be obtained by employing a smaller film thickness.

In one or more embodiments of the present invention, the charge stripping film for an ion beam may have mechanical strength, and small coefficient of thermal expansion by heating and cooling. When the charge stripping film for an ion beam is a graphitic film, it is possible to reduce the coefficient of thermal expansion of the film, and thus strain by thermal expansion can be reduced, so that mechanical damage can be controlled. According to one or more embodiments of the present invention, the coefficient of thermal expansion in the film surface direction of the graphitic film may be not more than $1\times10^{-5}$/K, or not more than $7\times10^{-6}$/K. or not more than $5\times10^{-6}$/K. The lower limit of the coefficient of thermal expansion is not particularly limited, but is normally about $5\times10^{-7}$/K.

The tensile strength in the film direction of the charge stripping film for an ion beam as described herein may be not less than 5 MPa. The tensile strength may be not less than 10 MPa, or not less than 20 MPa, or not less than 30 MPa. While the upper limit of the tensile strength is not particularly limited, it may be, for example, 100 MPa. Regarding the graphitic film produced by the expansion method as described above, it was difficult to form a film having a thickness of less than 10 µm, and its tensile strength was not more than 0.2 kgf/cm² (namely, 0.02 MPa) in Patent Document 4, and was about 4 MPa in Comparative Example as will be described later. In contrast, in one or more embodiments of the present invention, the charge stripping film for an ion beam produced in Example as will be described later has a tensile strength of 40 MPa, and it is apparent that the graphitic film produced by the expansion method cannot be used for one or more embodiments of the present invention also from the view point of the tensile strength. Further, the mechanical strength of the amorphous carbon film and the carbon-boron hybrid film that have been conventionally used as charge stripping films is not more than 1 MPa, and this would be one factor of deterioration in the durability of the hybrid film.

In one or more embodiments of the present invention, the density of the charge stripping film for an ion beam as described herein may be not less than 1.6 g/cm³. Generally, a highly heat conductive carbon film has a very dense structure lacking a defect or a cavity in the film, however, when a defect or a cavity enters inside the carbon film, the density decreases and the thermal conductivity tends to decrease. It is considered that heat is likely to be trapped in the cavity part, and the carbon film having low density is susceptible to deterioration by the heat. Thus, the density of the graphitic film may be large, for example, may be not less than 1.8 g/cm³, or not less than 2.0 g/cm³. The upper limit of the density is not more than 2.26 g/cm³ which is a theoretical value for the graphite single crystal.

The area of the charge stripping film for an ion beam as described herein may be not less than 4 cm². From the view point that the larger the area is, the more the thermal diffusivity improves and the charge stripping film can withstand the high intensity beam over a long period of time, the area may be not less than 9 cm², or not less than 16 cm², or not less than 25 cm². The larger the area is, the more the heat-release property improves, and the effect of releasing heat from the high intensity beam is high. Contrarily, when the case where an area is too small, it may be difficult to fix the film to a jig or a heat sink, and the heat radiation efficiency may be impaired. While the upper limit of the area is not particularly limited, it is normally about 900 cm².

As previously described, in order to convert a high intensity beam to have an intended charge state, carbon of a specific weight per unit area is required, and in the charge stripping film of carbon (carbon beam), carbon may be not less than 0.02 mg/cm² and not more than 2.0 mg/cm², or not less than 0.1 mg/cm² and not more than 2.0 mg/cm², or not less than 0.4 mg/cm² and not more than 2.0 mg/cm². For example, for the purpose of charge stripping of carbon (carbon beam), it is important that the film thickness of the carbon film can be controlled freely so that the carbon is not less than 0.02 mg/cm² and not more than 2.0 mg/cm². In one or more embodiments of the present invention, as will be described later, the thickness of the charge stripping film for an ion beam can be freely varied by controlling the film thickness of the polymer film that is a raw material, and the area and the shape of the charge stripping film can also be varied easily.

In one or more embodiments of the present invention, the charge stripping film for an ion beam as described herein may be adjusted to have an intended thickness. In such embodiments, the charge stripping film may be used alone (single layer body). It is also envisioned that two or more films may be laminated to adjust into an intended thickness (laminated body). Consideration of one or more embodiments of the present invention revealed that the charge stripping film for an ion beam as described herein sufficiently functions as a charge stripping film even when a plurality of charge stripping films are laminated, and this is also a great advantage of one or more embodiments of the present invention. By using the charge stripping film for an ion beam as described herein, it is possible to easily produce films with various thicknesses that are optimum for the desired beam charge state only by changing the combination of the charge stripping films for ion beam having different thicknesses.

In each case of the single layer body and the laminated body, the body is used as a charge stripping film having a thickness of not less than 100 nm and less than 10 μm. When two or more charge stripping films for an ion beam as described herein are used, the charge stripping films may be closely adhered, or may be arranged one by one independently at an interval in the travel direction of the ion beam. In the case of arranging the charge stripping films one by one independently, if the interval is too small, heat is likely to be trapped between the charge stripping films at the time of irradiation with a beam, and the possibility of damage arises. Therefore, in laminating two or more films, the films may be closely adhered.

In the case of using the charge stripping film for an ion beam as described herein as a charge stripping film, a different kind of carbon film may be laminated on the charge stripping film for an ion beam. In particular, for finely controlling the ion charge state of the beam, the thickness of the charge stripping film may be finely controlled. In such a case, the thickness can be finely controlled by making a carbon film (carbonaceous film) on the charge stripping film for an ion beam as described herein by vapor deposition, sputtering or the like. The carbon film (carbonaceous film) obtained by vapor deposition, sputtering or the like normally has a thermal conductivity in the film surface direction at 25° C. of less than 800 W/mK. Since the charge stripping film for an ion beam according to one or more embodiments of the present invention is excellent in physical strength, no problem arises even when a composite carbon film is produced by such a technique.

While the kind of the atom of the ion beam for which charge stripping is conducted by the charge stripping film as described herein is not particularly limited, the charge stripping film may be used for, in particular, an ion beam of an atom having an atomic number of not more than 8, such as a proton, a carbon beam or the like. The graphitic charge stripping film as described herein may be used not only in a large-size accelerator, but also in a medical accelerator such as an accelerator for cancer therapy and in a relatively small-size accelerator for industrial use or the like.

In one or more embodiments of the present invention, the charge stripping film for an ion beam is high thermal conductive film, and has high carbon purity, so that it is chemically stable without the fear of radioactivation after irradiation with a high intensity beam, and has very high heat resistance, and lacks the fear of outgassing in high vacuum under high temperature. Also, the charge stripping film can be obtained as a large area film, and is featured by excellent mechanical strength.

Next, a method for producing the charge stripping film according to one or more embodiments of the present invention will be described. The charge stripping film as described herein can be produced by using a predetermined polymer material, and graphitizing the polymer material by conducting a heat treatment at not less than 2400° C. in an inert gas atmosphere.

<Polymer Raw Material>

The polymer raw material that may be used in the production of a graphitic charge stripping film as described herein is an aromatic polymer, and the aromatic polymer may be at least one selected from the group consisting of polyamide, polyimide, polyquinoxaline, polyparaphenylene vinylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof. The film formed of such a polymer raw material can be produced by a known production process. Examples of the polymer raw material may include aromatic polyimide, polyparaphenylene vinylene, and polyparaphenylene oxadiazole. In one or more embodiments of the present invention, aromatic polyimide that is produced from acid dianhydride (particularly, aromatic acid dianhydride) and diamine (particularly, aromatic diamine) described below via polyamic acid may be used as a polymer raw material for producing a graphitic charge stripping film as described herein.

Examples of the acid dianhydride used in synthesis of the aromatic polyimide include pyromellitic anhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenone tetracarboxylic dianhydride, 2,2-bis(3,4-dicarboxyphenyl)propane dianhydride, 3,4,9,10-perylene tetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoester acid anhydride), ethylene bis(trimellitic monoester acid anhydride), bisphenol A bis(trimellitic monoester acid anhydride), and analogues thereof, and these can be used solely or a mixture of any desired ratio. In particular, for the reason that the polyimide film having a polymer architecture having a very rigid structure has higher orientation, and from the view point of the availability, pyromellitic anhydride, and 3,3',4,4'-biphenyltetracarboxylic dianhydride may be used.

Examples of the diamine used in synthesis of the aromatic polyimide include 4,4'-diaminodiphenylether, p-phenylenediamine, 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether, 3,3'-diaminodiphenylether, 3,4'-diaminodiphenylether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene (p-phenylenediamine), 1,3-diaminobenzene, 1,2-diaminobenzene and analogues thereof, and these can be used solely or a mixture of any desired ratio. Further, from the view point of improving the orientation of the polyimide film, and the availability, the aromatic polyimide may be synthesized by using 4,4'-diaminodiphenylether, or p-phenylenediamine as a raw material.

For the preparation of polyamic acid from acid dianhydride and diamine, a known method can be used, and normally, at least one kind of aromatic acid dianhydride and at least one kind of diamine are dissolved in an organic solvent, and the obtained solution of polyamic acid in organic solvent is stirred under a controlled temperature condition until polymerization between the acid dianhydride and the diamine completes. These polyamic acid solutions may be obtained normally in a concentration of 5 to 35 wt %, or in a concentration of 10 to 30 wt %. When the concentration falls within this range, an appropriate molecular weight and solution viscosity can be obtained. In one or more embodiments of the present invention, acid dianhydride and diamine in the raw material solution may be substantially equivalent molar amounts, and the molar ratio may be, for example, 1.5:1 to 1:1.5, or 1.2:1 to 1:1.2, or 1.1:1 to 1:1.1.

<Synthesis of Polymer Raw Material, Film Formation>

The polymer film can be produced from the polymer raw material or the synthetic material thereof by various known techniques. As a method for producing polyimide, a heat curing method in which a polyamic acid as a precursor is converted into imide by heating, and a chemical curing method in which a polyamic acid is converted into imide by using a dehydrating agent typified by acid anhydride such as acetic anhydride, or tertiary amines such as picoline, quinoline, isoquinoline, and pyridine as an imidization promoting agent are known, and any of these methods can be used. A chemical curing method may be used from the view point that the obtained film has a small coefficient of linear expansion, and high modulus of elasticity, and tends to have large birefringence index, and is not damaged under a tension during annealing of the film, and a carbon film having excellent quality is obtained. The chemical curing method is excellent also in the aspect of improvement in the thermal conductivity of the carbon film.

The polyimide film is produced by casting a solution of polyamic acid which is the aforementioned polyimide precursor in an organic solvent, on a support such as an endless belt or a stainless drum, and drying to allow imidization. Specifically, the production process of the film by chemical curing is as follows. First, in the aforementioned polyamic acid solution, not less than a stoichiometric quantity of a dehydrating agent, and a catalytic amount of an imidization promoting agent are added, and the solution is casted or applied on a support plate or an organic film of PET or the like, or a support such as a drum or an endless bell, to give a film form, and the organic solvent is evaporated to give a film having self-supportability. Subsequently, the film is imidized while it is further heated and dried to obtain a polyimide film. The temperature in heating may be in the range of 150° C. to 550° C. Further, the production process of the polyimide may include the step of fixing or elongating the film so as to prevent it from contracting. This is based on the fact that conversion into the carbon film proceeds more easily by using a film in which molecular structure and its high order structure are controlled. That is, in order to make the graphitization reaction proceed smoothly, it is necessary to rearrange the carbon molecules in the graphite precursor. It is supposed that conversion to graphite is easy to proceed even at low temperature because only minimum rearrangement is required in polyimide having excellent orientation.

The charge stripping film for an ion beam of as described herein has a thickness within the range of not less than 100 nm and less than 10 μm, and for obtaining a carbon film of such a range, the thickness of the polymer film as a raw material may be in the range of 200 nm to 25 μm in the case of aromatic polyimide. This is because the thickness of the finally obtained carbon film generally depends on the thickness of the starting polymer film, and the thickness of the charge stripping film for an ion beam obtained in the process of carbonization and graphitization by the heat treatment at not less than 2400° C. becomes about ½ of the thickness of the polymer as a raw material. As described above, it is important that the thickness of the charge stripping film can be freely varied depending on the charge of the original beam, the charge of the beam after charge stripping, and the kind of the beam. According to the polymer annealing method, it is possible to freely vary the thickness of the obtainable charge stripping film for an ion beam by controlling the film thickness of the polymer film as a raw material, and it is possible to easily vary the area or the shape. Thus, the polymer firing method is very suitable process for producing a charge stripping film.

<Carbonization, Graphitization>

Next, the technique of carbonization and graphitization of the polymer film typified by polyimide will be described. In one or more embodiments of the present invention, a polymer film as a raw material is preheated in an inert gas or in a vacuum to be carbonized. As the inert gas, nitrogen, argon or a mixed gas of argon and nitrogen may be used. The preheating is generally conducted at about 1000° C. The heating rate to the preheating temperature is not particularly limited, but can be, for example, 5 to 15° C./minute. In the preheating stage, it is effective to apply a pressure in the vertical direction on a film surface to such an extent that breakage of the film does not occur so as to prevent the orientation of the starting polymer film from being lost.

The film carbonized by the method as described above is set in a high temperature furnace, and a graphitized. The carbonized film may be set in such a manner that it is sandwiched between CIP materials or glassy carbon substrates. Graphitization is conducted at not less than 2400° C. In this manner, it is possible to make the thermal conductivity in the film surface direction of the obtainable charge stripping film for an ion beam not less than 800 W/mK. Graphitization is conducted at high temperatures which may be not less than 2600° C., or not less than 2800° C., or not less than 3000° C. The treatment temperature may be the highest temperature in the graphitization process, and the obtained charge stripping film can be heat-treated again in the form of annealing. In order to produce such a high temperature, generally, a current is directly applied to a graphite heater, and heating is conducted by utilizing the Joule heat. While the graphitization is conducted in an inert gas, argon is most appropriate as an inert gas, and a small amount of helium may be added to argon. The higher the treatment temperature is, the higher quality of graphite is obtained by conversion, however, an excellent charge stripping film for an ion beam is obtained even when the treatment temperature is, for example, not more than 3700° C., particularly, not more than 3600° C., or not more than 3500° C.

The heating rate from the preheating temperature to the heat treatment temperature can be, for example, 1 to 25° C./minute. The retention time at the treatment temperature is, for example, not less than 10 minutes, or may be not less than 30 minutes, and may be not less than 1 hour. An upper limit of the retention time is not particularly limited, but may be generally, not more than 10 hours, in particular, about not more than 5 hours. When the heat treatment is conducted at a temperature of not less than 3000° C. to graphitize, the atmosphere in the high-temperature furnace may be pressurized by the inert gas. When the heat treatment temperature is high, carbon starts sublimating from the film surface, and deterioration phenomena such as expansion of holes and cracks on the graphite film surface, and thinning occur. However, by pressurization, such deterioration phenomena can be prevented, and an excellent graphite film can be obtained. The pressure (gauge pressure) of atmosphere in the high-temperature furnace by the inert gas is, for example, not less than 0.05 MPa, or may be not less than 0.10 MPa, or not less than 0.14 MPa. While the upper limit of the pressure of atmosphere is not particularly limited, it may be, for example, not more than 2 MPa, in particular, about not more than 1.8 MPa. After the heat treatment, the temperature can be lowered at a rate of, for example, 30 to 50° C./minute.

<Evaluation of Charge Stripping Film for an Ion Beam>

For the film obtained through the carbonization and graphitization treatments as described above, whether the film is carbonaceous or graphitic can be evaluated by a laser Raman measurement. For example, in the case of laser Raman spectroscopy, a band (RG) based on a graphite structure appears at 1575 to 1600 $cm^{-1}$, and a band (RC) based on an amorphous carbon structure appears at 1350 to 1360 $cm^{-1}$. Therefore, by conducting Raman measurement for the graphite film surface, and measuring a relative intensity ratio RG/RC of these two bands, whether the obtained film is an amorphous carbonaceous film or a graphitic charge stripping film for an ion beam can be determined. The relative intensity ratio RG/RC is called Raman intensity ratio R. In the case of one or more embodiments of the present invention, Raman measurement is conducted for a graphite film surface, and the graphite film showing the intensity of the band based on the graphite structure higher than the intensity of the band based on the amorphous carbon structure by 5 times or more (namely, Raman intensity ratio R≥5) is defined as a graphitic charge stripping film for an ion beam.

As an index for determining whether the obtained film is a charge stripping film for an ion beam or a carbonaceous film, physical properties of thermal conductivity of the film can be used. When an aromatic polyimide (trade name: Kapton) was used as a raw material and a thickness of the film as a raw material was 25 μm (therefore, the thickness of the obtained film was about 10 μm), the thermal conductivity of the film obtained by the heat treatment was 50 W/mK at 2000° C., 200 W/mK at 2200° C., 800 W/mK at 2400° C., 1200 W/mK at 2600° C., 1600 W/mK at 3000° C. At this time, the Raman intensity ratio R was R=1 for the treatment at 2200° C., R=5 for the treatment at 2400° C., R=6 for the treatment at 2600° C., and R>99 for the treatment at 3000° C. At the temperatures of not less than 2400° C. where the Raman intensity rapidly increases and the graphitization proceeds, the value of thermal conductivity also rapidly increases, revealing that these values can also be good indexes for determining the graphitization.

The present application claims the benefit of priority based on Japanese Patent Application No. 2015-083716 filed on Apr. 15, 2015. The entirety of description of Japanese Patent Application No. 2015-083716 filed on Apr. 15, 2015 is incorporated in the present application for reference.

EXAMPLES

Hereinafter, one or more embodiments of the present invention will be described more specifically by way of Examples. Of course, it goes without saying that the present invention is not limited by these Examples, and various forms can be made for the details.

(Evaluation Method of Physical Property)

<Film Thickness>

The thickness of the polymer film which is a raw material, and the thickness of the produced charge stripping film include an error of about ±5 to 10%. Therefore, the mean of thicknesses measured at different 10 points in the polymer film as a raw material or the obtained charge stripping film was adopted as the thickness of the sample in one or more embodiments of the present invention. When the film thickness of the produced charge stripping film is not more than 0.5 μm, the film section was observed at an accelerating voltage of 5 kV by using a scanning electron microscope (SU8000) manufactured by Hitachi High-Technologies Corporation, and the thickness was calculated.

<Density>

A volume was calculated after measurement of the dimension of the film and the film thickness, and a mass was separately measured, and density of the produced charge stripping film was calculated from the formula: density (g/cm$^3$)=mass (g)/volume (cm$^3$). It was impossible to measure the density of a film having a thickness of not more than 200 nm by this method because the error was too large. Thus, in calculating thermal conductivity from thermal diffusivity of a film having a thickness of not more than 200 nm, the calculation was conducted assuming that the density was 2.1.

<Thermal Conductivity>

The thermal diffusivity of the charge stripping film was measured at 25° C. in vacuum (about 10$^{-2}$ Pa), at a frequency of 10 Hz using a thermal diffusivity measuring apparatus based on the periodic heating method ("LaserPit" apparatus, available from ULVAC-RIKO, Inc.). In this measuring method, a thermocouple is attached at a point apart by a certain distance from a point irradiated with a laser to be heated, and the temperature change of the thermocouple is measured. The thermal conductivity (W/mK) was calculated by multiplying thermal diffusivity (m$^2$/s), density (kg/m$^3$), and specific heat (798 kJ/(kg-K)). However, when the thickness of the graphite sheet is not more than 1 μm, the measurement error is too large, and accurate measurement was impossible.

Thus, as a second measuring method, measurement was conducted by using a periodical heating radiant temperature measuring (Thermo Analyzer TA3 manufactured by BETHEL Co., Ltd.). This is an apparatus that conducts periodical heating by a laser, and measures the temperature by a radiation thermometer. Since the non-contact measurement was carried out using this apparatus, a graphite sheet with the thickness of not more than 1 μm was able to be measured. For confirming the reliability of the measured values by both methods, several graphite films were measured by both methods and both measured values were confirmed to be identical.

The frequency of periodical heating using BETHEL apparatus can be varied up to 800 Hz. The features of this apparatus are non-contact temperature measurement using a radiation-thermometer instead of conventional contact temperature measurement method with thermocouple and, the measurement frequency can be varied. Principally, thermal diffusivity results should be same even when the frequency is varied, the measurement using this apparatus, measurement was conducted at varied frequencies. When measurement was conducted with a sample having a thickness of not more than 1 μm at 10 Hz or 20 Hz, the measured values were often varied, whereas, the measured values were almost constant in the range between 70 Hz and 800 Hz. Thus, the numerical value that is constant regardless of the frequency (between 70 Hz and 800 Hz) is determined as thermal diffusivity.

<Tensile Strength>

The tensile strength of a film was measured according to the method of ASTM-D882.

<Coefficient of Thermal Expansion>

The coefficient of thermal expansion of a charge stripping film for an ion beam was determined by TMA measurement according to JIS K7197. The measurement temperature range was from 0° C. to 600° C.

<Determination of Carbon Purity>

The carbon purity of the produced charge stripping film for an ion beam was measured by a scanning electron microscope (SU8000) manufactured by Hitachi High-Technologies Corporation, and a large-diameter SDD detector (hereinafter, EDX-XMax) manufactured by HORIBA, Ltd. Elemental analysis of the carbon film was conducted at an accelerating voltage of 20 kV, and based on the atomic concentration (%) of each elements calculated after the analysis by attached software, the carbon purity was calculated by the following formula (1):

Carbon purity (%)=atomic concentration of carbon (%)/[atomic concentration of carbon (%)+ atomic concentration of elements other than carbon (%)]×100   (1)

<Durability Test of Charge Stripping Film>

The FIGURE is a schematic perspective view of a fixing jig for use in a durability evaluation test of a charge stripping film. A plurality of SiC fibers 12 are set on an aluminum member 11, and on the SiC fibers 12, a produced charge stripping film 10 is pasted together. Durability was evaluated by irradiating a substantially center part 13 of the charge stripping film with a $^{20}$Ne$^+$DC beam of 3.2 MeV, 2.5±0.5 μA having a beam spot diameter of 3.5 mm from a Van de Graaff accelerator. When the film withstood for irradiation of an ion beam after 48 hours or more, the film was determined as passing the durability test, and when the film broke within 48 hours, the test was interrupted.

(Production of Polymer Films)

A hardener comprising 20 g of acetic anhydride and 10 g of isoquinoline was mixed to 100 g of an 18 wt % DMF solution of a polyamic acid synthesized from pyromellitic acid anhydride and 4,4'-diaminodiphenyl ether in a proportion of 1/1 in terms of the mole ratio to be stirred, and after being centrifuged to be degassed, the liquid was cast and applied on a aluminum foil. The process from stirring to defoaming was conducted at 0° C. After heating the resultant laminate of the aluminum foil and the polyamic acid solution for 150 seconds at 120° C., and every 30 seconds at 300° C., 400° C., and 500° C. respectively. Then the aluminum foil was removed to produce polyimide films (polymer sample A) having different thicknesses. In a similar way for sample A, polyimide films (polymer sample B) were produced by using pyromellitic anhydride and p-phenylene diamine as raw materials, and polyimide films (polymer sample C) were produced by using 3,3'4,4'-biphenyltetracarboxylic dianhydride and p-phenylene diamine as raw materials. Regarding the thickness of the polyimide film, several kinds of films having different thicknesses ranging from 200 nm to 25 μm were produced by adjusting the casting speed.

Production Examples 1 to 7 of Charge Stripping Films

Seven polymer films (sample A) having different thicknesses (ranging from 0.4 to 25 μm) were heated up to 1000° C. at a rate of 10° C./minute in nitrogen gas using an electric furnace, and they were retained at 1000° C. for 1 hour to conduct a pre-treatment. Then the obtained carbonized films were set inside a cylindrical carbon heater, and heated up to 3000° C. at a heating rate of 20° C./minute to conduct a heat treatment. The films were retained at this temperature for 30 minutes, and then the temperature was lowered at a rate of 40° C./minute, to produce charge stripping films 1 to 7. The treatment was conducted in an argon atmosphere under pressurizing at 0.1 MPa.

(Production Examples 8, 9 of Charge Stripping Films)

Each of a polymer film having a thickness of 10 μm (sample B), and a polymer film having a thickness of 7.0 μm (sample C) were heated up to 1000° C. at a rate of 10° C./minute in nitrogen gas using an electric furnace, and they were retained at 1000° C. for 1 hour, to conduct a pre-treatment. Then the obtained carbonized films were set inside a cylindrical carbon heater, and heated up to 3000° C. at a heating rate of 20° C./minute to conduct a heat treatment. The films were retained at this temperature for 30 minutes, and then the temperature was lowered at a rate of 40° C./minute, to produce charge stripping films 8, 9. The treatment was conducted in an argon atmosphere under pressurizing at 0.1 MPa.

(Production Examples 10 to 13 of Charge Stripping Films)

Polyimide films of polymer sample A having a thickness of 3.2 μm were heated up to 1000° C. at a rate of 10° C./minute in nitrogen gas using an electric furnace, and the films were retained at 1000° C. for 1 hour, to conduct a pre-treatment. Then the obtained carbonized films were set inside a cylindrical carbon film heater, and charge stripping film 10 (2800° C.), charge stripping film 11 (2600° C.), charge stripping film 12 (2400° C.), and charge stripping film 13 (2200° C.) were heated to the respective highest temperatures at a heating rate of 20° C./minute. The films were retained at these temperatures for 30 minutes, and then the temperature was lowered at a rate of 40° C./minute, to produce charge stripping films 10 to 13. The treatment was conducted in an argon atmosphere under pressurizing at 0.1 MPa.

Production Examples 14, 15 of Charge Stripping Films

Polyimide films of polymer sample A having a thickness of 0.2 μm were heated up to 1000° C. at a rate of 10° C./minute in nitrogen gas using an electric furnace, and the films were retained at 1000° C. for 1 hour, to conduct a pre-treatment. Then the obtained carbonized films were set inside a cylindrical carbon film heater, and heated up to 2600° C., and 3000° C., respectively at a heating rate of 20° C./minute. The films were retained at these temperatures for 30 minutes, and then the temperature was lowered at a rate of 40° C./minute, to produce charge stripping films 14, 15. The treatment was conducted in an argon atmosphere under pressurizing at 0.1 MPa.

Production Examples 16, 17 of Charge Stripping Films

Polyimide films of polymer sample A having a thickness of 25 μm were heated up to 1000° C. at a rate of 10° C./minute in nitrogen gas using an electric furnace, and the films were retained at 1000° C. for 1 hour to conduct a pre-treatment. Then the obtained carbonized films were set inside a cylindrical carbon film heater, and heated up to 2200° C., and 2600° C. respectively at a heating rate of 20° C./minute. The films were retained at these temperatures for 30 minutes, and then the temperature was lowered at a rate of 40° C./minute, to produce charge stripping films 16, 17. The treatment was conducted in an argon atmosphere under pressurizing at 0.1 MPa.

For these charge stripping films 1 to 17, measurement results of film thickness, thermal conductivity, density, tensile strength and carbon purity are shown in Table 1.

Regarding Raman intensity ratios of the charge stripping films from 1 to 9 and 15 that were treated at 3000° C., a peak derived from amorphous carbon could not be observed, and Raman intensity ratio R was not less than 99. The Rs of charge stripping films 13, 16 were 1 indicating that they were composed of amorphous carbonaceous. The R of the charge stripping film 12 treated at 2400° C. was 5 and the Rs of the charge stripping films 11, 14, 17 treated at 2600° C. were 6, and the R of the charge stripping film 10 treated at 2800° C. was 20. These results suggested that heating temperature at not less than 2400° C. is required for converting into the graphitic charge stripping film.

TABLE 1

| Charge Stripping Film | Highest Temp. (° C.) | Kind of Polymer Sample (Polyimide) | Thickness of Charge Stripping Film (μm) | Thermal Conductivity (W/mK) | Density (g/cm$^3$) | Tensile Strength (MPa) | Carbon Purity (at %) | Weight per Unit Area (mg/cm$^2$) | Ratio of Raman Intensity (R) |
|---|---|---|---|---|---|---|---|---|---|
| 1 | 3000 | A | 9.6 | 1900 | 2.05 | 40 | >99 | 1.97 | >99 |
| 2 | 3000 | A | 4.7 | 1950 | 2.07 | 44 | >99 | 0.97 | >99 |
| 3 | 3000 | A | 2.1 | 2000 | 2.11 | 50 | >99 | 0.44 | >99 |
| 4 | 3000 | A | 1.2 | 2000 | 2.22 | 60 | >99 | 0.27 | >99 |
| 5 | 3000 | A | 0.72 | 1950 | 2.22 | 48 | >99 | 0.16 | >99 |
| 6 | 3000 | A | 0.31 | 1980 | 2.20 | 40 | >99 | 0.07 | >99 |
| 7 | 3000 | A | 0.14 | 1920 | 2.21 | 44 | >99 | 0.03 | >99 |
| 8 | 3000 | B | 4.3 | 1960 | 2.15 | 40 | >99 | 0.92 | >99 |
| 9 | 3000 | C | 3.4 | 1980 | 2.20 | 40 | >99 | 0.75 | >99 |
| 10 | 2800 | A | 2.1 | 1600 | 2.00 | 40 | 99.0 | 0.42 | 20 |
| 11 | 2600 | A | 2.2 | 1200 | 1.90 | 40 | 98.6 | 0.42 | 6 |
| 12 | 2400 | A | 2.2 | 800 | 1.82 | 40 | 98.0 | 0.40 | 5 |
| 13 | 2200 | A | 2.3 | 200 | 1.67 | 40 | 96.8 | 0.38 | 1 |
| 14 | 2600 | A | 0.08 | 1000 | — | 10 | 99.0 | 0.02 | 6 |
| 15 | 3000 | A | 0.06 | 1860 | — | 10 | >99 | 0.01 | >99 |
| 16 | 2200 | A | 12.2 | 140 | 1.62 | 40 | 96.7 | 1.98 | 1 |
| 17 | 2600 | A | 10.5 | 700 | 2.05 | 46 | 98.7 | 2.15 | 6 |

These results show that charge stripping films 1 to 12 obtained by heat treating the polyimide films as raw materials at temperatures of not less than 2400° C. have a carbon purity of not less than 96 at %, and are graphitic, and have a thermal conductivity in the film surface direction of not less than 800 W/mK. On the other hand, the charge stripping film 13 for which heat treatment temperature was 2200° C. had a thermal conductivity of 200 W/mK, and could not satisfy the requirement of the thermal conductivity of one or more embodiments of the present invention. That is, by the heat treatment at not less than 2400° C., charge stripping films for ion beam satisfying the requirement of one or more embodiments of the present invention are obtained. While the charge stripping film 13 heat-treated at 2200° C. had a carbon purity of 96.8 at %, any of the charge stripping films 1 to 12 heat-treated at not less than 2400° C. may realize a carbon purity of not less than 97 at %.

Further, the coefficient of thermal expansion of the film depends on the treatment temperature in the thickness range of one or more embodiments of the present invention (not less than 100 nm and less than 10 µm), and the coefficients of thermal expansion were $4\times10^6$/K (sample treated at 2400° C., namely, the charge stripping film 12), $2\times10^{-6}$/K (sample treated at 2600° C., namely, the charge stripping film 11), $1\times10^{-6}$/K (sample treated at 2800° C., namely, the charge stripping film 10), $9\times10^{-7}$/K (sample treated at 3000° C., namely, the charge stripping films 1 to 9), respectively. In one or more embodiments of the present invention, the coefficients of thermal expansion of charge stripping films for an ion beam were determined to be not more than $1\times10^{-5}$/K.

Table 1 also shows weight per unit area calculated from film thickness and density. As described above, a carbon weight per unit area of charge stripping film for carbon (carbon beam) for desired efficiency is for example, not less than 0.02 mg/cm$^2$ and not more than 2.0 mg/cm$^2$. All of the charge stripping films from 1 to 12 could satisfy the aforementioned range, and excellent charge stripping efficiency.

Concerning radioactivation, a higher carbon purity provides lower radioactivation. The charge stripping films from 1 to 12, radioactivation is sufficiently controlled due to a carbon purity of not less than 96 at %.

Examples 1 to 12

For the produced charge stripping films 1 to 12, a 48-hour durability test was conducted, and breakage or damage of the charge stripping films was not observed. A film thickness of not more than 1 µm, elongation of the film and slight deformation due to sublimation after irradiation were observed, however, a hole, a crack was not observed in the film.

Comparative Examples 1 to 4

Three kinds of expanded graphite sheets having different thicknesses [respectively having a film thickness of 20 µm (Comparative Example 1), 30 µm (Comparative Example 2), and 50 µm (Comparative Example 3)], and a carbon film having a thickness of 1 µm (Comparative Example 4) formed by sputtering were produced, and durability tests were conducted. As results, in any Comparative Example, the film was broken by irradiation within 2 hours. Examples 1 to 12 have excellent durability compared with these Comparative Examples. The tensile strength of the expanded graphite sheet was about 4 MPa, which is significantly smaller than that of Examples 1 to 12, revealing that the graphite film produced by the expansion method was unsuitable for one or more embodiments of the present invention.

Comparative Examples 5 to 9

A durability test was conducted for the charge stripping films 13, 14, 15, 16, 17. The film 13 ruptured at 8 hours, the film 14 ruptured at 24 hours, and the film 15 ruptured at 30 hours. It is inferred that these films are very thin (respectively, having a film thickness of 80 nm, 60 nm), and have sufficient thermal conductivity. However, they could not withstand the 48-hour durability tests owing to the low heat-release property and mechanical strength due to the thickness. The carbon film ruptured at 24 hours for the film 16, and at 28 hours for the film 17. It is inferred that the film 16 and the film 17 have sufficient characteristics as the tensile strength of the film, but they ruptured due to the deformation of the film caused by further graphitization proceeded by the heat during the long-time ion beam irradiation.

According to one or more embodiments of the present invention, it is possible to easily provide a charge stripping film for an ion beam, which can be used for long-time irradiation a high intensity beam. Since the charge stripping film has high carbon purity, there is little fear of radioactivation after a beam irradiation. The charge stripping film as described herein is a graphitic film, and the film has sufficient heat resistance and mechanical strength even with a thickness of less than 10 µm that enables to work or handle easily. Since the weight per unit area can be made higher, charge stripping efficiency will be higher than that of the carbon film of other kind with the same thickness. Further, the density of the films should be less than 1.6 g/cm$^3$ and not more than 2.26 g/cm$^3$ indicating that the carbon film contains less cavity, and heat generation by a beam irradiation can be controlled correspondingly, and durability to a beam irradiation can be improved. Thus, the charge stripping film must be an optimum material for the charge stripping film for an ion beam as described herein.

DESCRIPTION OF REFERENCE SIGNS 10 charge stripping film
11 aluminum member
12 SiC fiber Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A charge stripping method, comprising
   irradiating a charge stripping film with an ion beam,
   wherein the charge stripping film comprises: a single layer body of a graphitic film having a carbon component of at least 96 at % and a thermal conductivity in a film surface direction at 25° C. of at least 800 W/mK; or a laminated body of the graphitic film, and
   wherein the charge stripping film has a thickness of not less than 100 nm and less than 10 µm, a tensile strength in a film surface direction of at least 5 MPa, a coefficient of thermal expansion in the film surface direction of not more than $1\times10^{-5}$/K, and an area of at least 4 cm$^2$.

2. A charge stripping method, comprising
   irradiating a charge stripping film with an ion beam,
   wherein the ion beam is selected from the group consisting of a negative hydrogen ion beam, a hydrogen ion beam, and a carbon ion beam,
   wherein the stripping film comprises: a single layer body of a graphitic film having a carbon component of at least 98 at % and a thermal conductivity in a film surface direction at 25° C. of at least 1000 W/mK; or a laminated body of the graphitic film, and wherein the charge stripping film has a thickness of 100 nm to 5 μm, a tensile strength in a film surface direction of at least 5 MPa, a coefficient of thermal expansion in the film surface direction of not more than $1\times10^{-5}$/K, and an area of at least 4 cm².

3. The method according to claim 1, wherein the charge stripping film is obtained by heat-treating a polymer film at a temperature of at least 2400° C. in an inert gas atmosphere, and wherein the polymer film comprises at least one selected from the group consisting of polyamide, polyimide, polyquinoxaline, polyparaphenylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof.

4. The method according to claim 3, wherein the polymer film comprises aromatic polyimide.

5. The method according to claim 1, wherein the tensile strength is at least 20 MPa.

6. The method according to claim 1, wherein the charge stripping film is obtained by heat-treating a polymer film at a temperature of at least 2800° C. in an inert gas atmosphere.

7. The method according to claim 3, wherein the polymer film has a thickness of 200 nm to 25 μm.

8. The method according to claim 2, wherein the tensile strength is at least 20 MPa.

9. The method according to claim 2, wherein the charge stripping film is obtained by heat-treating a polymer film at a temperature of at least 2400° C. in an inert gas atmosphere, and wherein the polymer film comprises at least one selected from the group consisting of polyamide, polyimide, polyquinoxaline, polyparaphenylene, polyoxadiazole, polybenzimidazole, polybenzoxazole, polybenzothiazole, polyquinazolinedione, polybenzoxazinone, polyquinazolone, benzimidazobenzophenanthroline ladder polymer, and derivatives thereof.

10. The method according to claim 2, wherein the charge stripping film is obtained by heat-treating a polymer film at a temperature of at least 2800° C. in an inert gas atmosphere.

11. The method according to claim 9, wherein the polymer film has a thickness of at least 200 nm to 25 μm.

12. The method according to claim 9, wherein the polymer film comprises aromatic polyimide.

13. The method according to claim 1, wherein electrons are removed from ions of the ion beam after the irradiation.

14. The method according to claim 2, wherein electrons are removed from ions of the ion beam after the irradiation.

* * * * *